United States Patent Office 2,886,119
Patented May 12, 1959

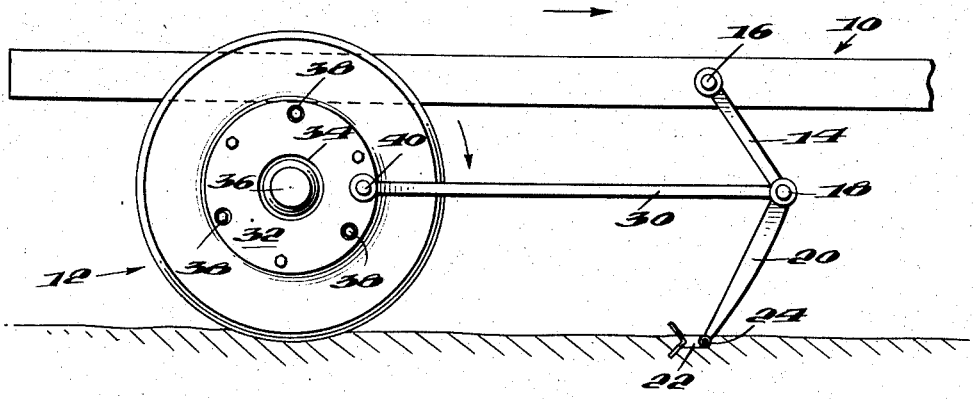
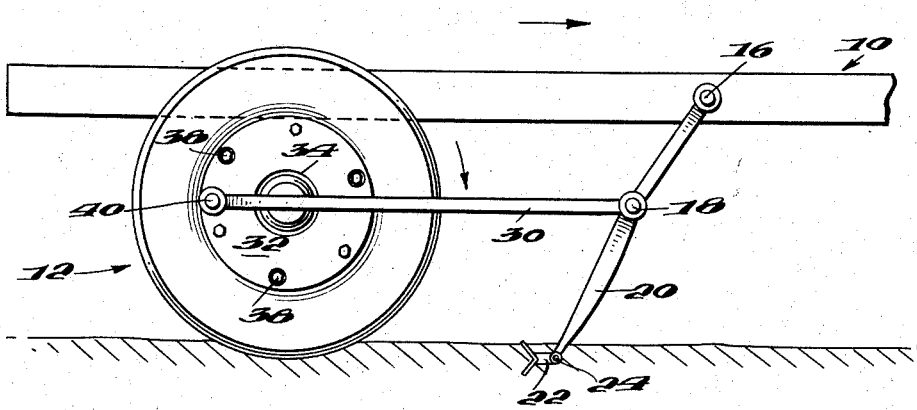
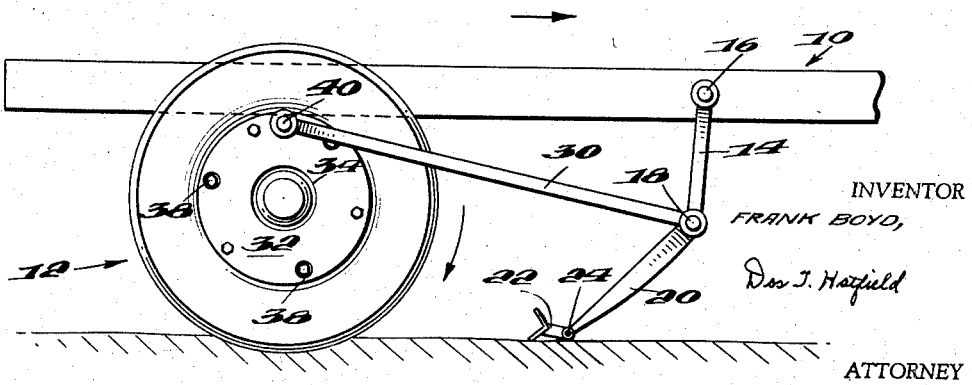

2,886,119

MECHANISM FOR REMOVING A SELF-PROPELLED VEHICLE FROM MUD, SNOW AND THE LIKE

Frank Boyd, Durkee, Oreg.

Application March 18, 1957, Serial No. 646,876

6 Claims. (Cl. 180—8)

This invention relates to a mechanism for attachment to an immobile self-propelled vehicle so that the vehicle may again become mobile.

The main object of this invention is to provide a mechanism to mobilize an immobile self-propelled vehicle.

As is well known, self-propelled vehicles occasionally become mired in mud, snow or the like, or otherwise become immobile because of loss of traction of one or more of the driving wheels. Accordingly, another important object of this invention is to provide a simple mechanism which may be easily attached to a self-propelled vehicle and which may be actuated by the main power plant to move an immobile vehicle until the driving wheels of the vehicle are afforded the necessary traction.

Another object of the invention is to provide a mechanism which will accomplish the above-mentioned function, which mechanism is simple in construction, may be easily and cheaply manufactured, has relatively few working parts, and which may be easily handled, quickly attached to the vehicle and thereafter quickly removed from the same, by one person.

The distinguishing features of the invention and the important structural elements in the preferred embodiment which is given as an example, will be more particularly explained in the specific description hereinafter to be given.

Reference is to be had to the accompanying drawings forming a part of this specification, in which similar characters of reference indicate corresponding parts throughout the drawings.

Figure 1 is a diagrammatic side elevational view of the mechanism attached to the vehicle showing the mechanism as it appears when first attached to the vehicle.

Figure 2 is a diagrammatic side elevational view showing the mechanism at the completion of its driving stroke, while Figure 3 is a diagrammatic side elevational view showing the mechanism midway between the end of the driving stroke and the start of the subsequent driving stroke.

As seen in Figure 1 reference numeral 10 generally indicates a portion of the side frame of a self-propelled vehicle while reference character 12 generally indicates the traction wheel of the vehicle. Assuming that the vehicle has been mired in mud, snow or the like, or has otherwise become immobile due to loss of traction of one or more of its driving wheels, the mechanism forming the present invention is secured to the frame of the vehicle and to the driving wheel and positioned as shown in Figure 1. Thus, a link 14 is pivotally secured at 16 to the frame 10 in any suitable manner. For instance, the frame 10 may be drilled to provide a suitable aperture therein or therethrough for accommodating the pivotal connection 16. The lower end of the link 14 is pivotally secured as at 18 to an anchor link 20. The lower end of the anchor link 20 may be provided with a suitable ground-engaging spur 22 which is pivotally connected to the anchor link 20 as shown by reference character 24.

A rod 30 has one of its ends pivotally connected to the links 14 and 20, preferably by means of the pivotal connection 18 so that the single pivotal connection 18 will secure the lower end of link 14, upper end of anchor link 20 and the forward end of rod 30 together.

The rearward end of rod 30 is secured to the driving wheel 12 so as to be eccentrically mounted thereon. The present invention contemplates the use of a hub plate 32 which may be secured to the driving wheel 12 by use of the customary stud bolts although other suitable means of attachment may be employed. The purpose of the hub plate 32 is to provide an attaching means for the rod 30 to the driving wheel 12 so that the vertical plane of the rod 30 is outwardly beyond the vertical plane of the tire secured to the driving wheel. The customary hub cap is removed and thereafter a few of the stud bolts which secure the wheel to the vehicle are removed and the plate 32 may thereupon be secured to the wheel by means of the stud bolts. Thus, the hub plate 32 is annular in shape and is provided with a central aperture 34 so as to accommodate the axle 36 of the vehicle. A plurality of studs 38 are first removed from the wheel and the hub plate 32 is then positioned as shown in Figure 1 after which the studs 38 are again driven into clamping position. It will be noted that the rearward end of the rod 30 is pivotally secured at 40 to the hub plate 32, the pivotal connection being adjacent the outer periphery of the hub plate, so that the rearward end of the rod 30 is pivotally connected to the hub plate eccentrically thereof. The pivotal connection 40 may be permanently attached to the hub plate 32 or may be detachably secured thereto through the use of one of the stud bolts 38.

When a self-propelled vehicle becomes mired or otherwise immobile because of loss of traction, all that the operator need do is to remove the customary hub cap, secure link 14 with its pivotally-connected anchor link 20, spur 22 and rod 30 to the frame 10 of the vehicle by means of the pivotal connection 16. Thereafter, a few of the wheel studs 38 are removed and the hub plate 32 is secured to the driving wheel 12 by means of the replaced studs 38. The plate 32 is positioned on the driving wheel 12 so that the pivotal connection 40 between the rod 30 and hub plate 32 is approximately in the position shown in Figure 1. As shown in Figure 1, the spur 22 may be partially embedded in the ground or the like by manual manipulation. When power from the main power plant of the vehicle is applied to the driving wheel 12 to rotate the same in the direction of the arcuate arrows so as to move the vehicle in the direction of the longitudinal arrows, the driving wheel and hence the secured hub plate will rotate. Upon rotation of the driving wheel 180° the mechanism will assume the position as shown in Figure 2. Thus, the rotation of the driving wheel 12 will pull the rod rearwardly a distance substantially equal to the diameter of the hub plate 32. As the rod 32 is moved rearwardly, the upper portion of the anchor link 20 and the lower portion of link 14 will be pulled rearwardly to assume the position as shown in Figure 2. As the pivotal connection to the frame 16 is fixed, and as the spur 22 is firmly anchored in the ground surface or the like, the vehicle will be moved forwardly by an amount substantially equal to the diameter of the hub plate 32. After the vehicle and mechanism assume the position as shown in Figure 2, if the driving wheel 12 has not obtained sufficient traction the forward motion of the vehicle will cease. Further rotation of the driving wheel 12 will move the rod forwardly and such forward motion will force the upper end of anchor link 20 and the lower end of link 14 forwardly and such movement will draw the spur 22 from its anchored position in the ground.

Figure 3 shows a rotation of the driving wheel of approximately 270° from that shown in Figure 1 and thus shows the position of the anchor link 20 as it is removed from the ground. An additional 90° rotation of the driving wheel from that shown in Figure 3 will again position the mechanism as shown in Figure 1 and, hence, the pulling cycle may be repeated until the vehicle has been moved forwardly a sufficient amount to obtain the necessary traction for the driving wheel.

After the vehicle has been pulled forwardly by the above-described step-by-step movement to a position of sound traction for the driving wheels, the operator may then remove the three stud bolts 38 to remove the plate 32 from the wheel 12 and remove the pivotal connection 16 from the frame 10 to thus remove the entire mechanism from the vehicle. Thereafter, it is only necessary to again replace the studs 38 and re-mount the hub cap. The entire mechanism which includes the hub plate 32, reciprocating rod 30, links 14, 20, pivotal connection 18, spur 22 and pivotal connection 16 may be stored in any suitable manner in the body of the vehicle until the use of the mechanism is again required.

If both driving wheels have lost traction, it may be necessary to attach a similar mechanism described above to each driving wheel. I have found from experience, however, that when a self-propelled vehicle is immobilized it is usually because of loss of traction of only one driving wheel, and the application of my mechanism to one driving wheel which has lost traction will, in the majority of instances, be sufficient to move the entire vehicle to a position where sufficient traction can again be obtained.

It will be understood that the mechanism disclosed in the drawing and described hereinabove illustrates my invention in its simplest form and many modifications may be made thereto without departing from the basic invention intended to be protected by the appended claims.

What is claimed is:

1. An attachment mechanism for removing a self-propelled vehicle having a driving wheel from mud, snow and the like comprising a first anchor link having upper and lower ends, means for pivotally securing the upper end of said first link to the vehicle, a second anchor link having upper and lower ends, a rod, means for pivotally securing one end of said rod to each of said links and for securing the upper end of said second link to the lower end of said first link, and means connecting the driving wheel with the other end of said rod for reciprocating said rod.

2. The mechanism as set forth in claim 1 further including a ground-engaging spur member pivotally connected to the lower end of said second anchor link.

3. An attachment mechanism for removing a self-propelled vehicle having a driving wheel from mud, snow and the like comprising a first anchor link having upper and lower ends, means for pivotally securing the upper end of said first link to the vehicle, a second anchor link having upper and lower ends, a rod, means for pivotally securing one end of said rod to each of said links and for securing the upper end of said second link to the lower end of said first link, and means for securing the other end of said rod to the driving wheel eccentrically thereof so that rotation of the wheel will reciprocate said rod.

4. The mechanism as set forth in claim 3 further including a ground-engaging spur member pivotally connected to the lower end of said second anchor link.

5. A mechanism for removing a self-propelled vehicle from mud, snow and the like comprising, in combination, a vehicle having a driving wheel, a first anchor link having upper and lower ends, means for pivotally securing the upper end of said first link to said vehicle, a second anchor link having upper and lower ends, a rod, means for pivotally securing one end of said rod to each of said links and for securing the upper end of said second link to the lower end of said first link, a hub plate, means for securing said hub plate to said driving wheel for rotation therewith, and means for securing the other end of said rod to said plate eccentrically thereof so that rotation of said wheel will reciprocate said rod.

6. The mechanism as set forth in claim 5 further including a ground-engaging spur member pivotally connected to the lower end of said second anchor link.

References Cited in the file of this patent

UNITED STATES PATENTS

| 103,635 | Lynn | May 31, 1870 |
| 129,437 | Tibbles | July 16, 1872 |